United States Patent [19]

Hopkins et al.

[11] 4,306,387
[45] Dec. 22, 1981

[54] CONTROLLABLE INSULATING EFFECTS BY SELECTIVE INTERPOSITION OF INSULATING PARTICLES IN A CAVITY OF AN ENERGY TRANSMISSION PANEL ASSEMBLY

[75] Inventors: Danny L. Hopkins, 4816 E. Hinsdale, Littleton, Colo. 80122; Patrick C. Hardee, 3397 N. Weasel Way, Franktown, Colo. 80116

[73] Assignee: Danny L. Hopkins, Littleton, Colo.

[21] Appl. No.: 191,761

[22] Filed: Sep. 26, 1980

[51] Int. Cl.³ .......................... E06B 7/12; F24J 3/02; E04B 1/62
[52] U.S. Cl. .......................................... 52/1; 52/171; 52/173 R; 52/741; 126/419; 165/136; 406/109
[58] Field of Search ................. 52/1, 171, 172, 173 R, 52/741; 126/419, 429; 165/135, 136; 406/109

[56] References Cited

U.S. PATENT DOCUMENTS

| | | | |
|---|---|---|---|
| 1,403,335 | 1/1922 | Marchalonis | 52/171 |
| 1,974,739 | 9/1934 | Fraps | 52/171 |
| 2,439,553 | 4/1948 | Winn . | |
| 3,069,205 | 12/1962 | McIver et al. | 406/109 X |
| 3,107,052 | 10/1963 | Garrison . | |
| 3,675,023 | 7/1972 | Kunke et al. | 126/419 X |
| 3,903,665 | 9/1975 | Harrison | 52/171 |
| 3,908,632 | 9/1975 | Poulsen . | |
| 3,990,201 | 11/1976 | Falbel | 52/171 |
| 4,018,214 | 4/1977 | Saunders . | |
| 4,074,482 | 2/1978 | Klahr | 52/171 |
| 4,116,222 | 9/1978 | Seifried . | |
| 4,184,635 | 1/1980 | Bloomfield | 126/419 |
| 4,201,189 | 5/1980 | Saunders | 126/419 |
| 4,228,787 | 10/1980 | Steinemann | 126/429 X |
| 4,231,202 | 11/1980 | Dube | 52/171 |

OTHER PUBLICATIONS

Technical Publications of the International Society for Horticultural Science, No. 22, Nov. 1971, Symposium on Electricity and Artificial Light in Horticulture, 7 pages.

Primary Examiner—Alfred C. Perham
Attorney, Agent, or Firm—John R. Ley

[57] ABSTRACT

A system for selectively interposing particulate insulating material in a cavity of a transmission or window panel assembly employs an upper aperture into the cavity through which the insulating material enters and is removed. A flow diverting means adjacent the aperture diverts positive pressure air flowing toward the cavity into the ambient atmosphere, and the momentum of the insulating material causes it to continue through the aperture and fill the cavity. Suction pressure air flow out of the aperture removes the insulating particles, and ambient pressure air flows into the lower portion of the cavity through vents to lift the insulating material upward out of the cavity. The flow diverting means confines the suction air flow out of the cavity to the conduit or communicating means connected to the aperture. A mode selection valve means operatively connects one of either a blower inlet or a blower outlet to the air flow conducting conduit to create positive pressure or suction pressure air flow to fill or empty the cavity. A storage chamber for the insulating material is preferably located in close adjacency to the panel assembly in the space between a suspended ceiling and an upper structure or floor of a building. Branch valves operatively communicate the air flow with each storage chamber. A system control means operates the branch valve and the mode selection valve and the blower to create the desired air flow for changing the status, either empty or filled, of the cavities. The system control means includes temperature sensors for sensing the interior and exterior temperatures adjacent the panel assembly or a group of associated panel assemblies, and the temperature information is utilized to determine the most favorable status of the cavity to reduce heat load loss or heat load gain to the structure.

40 Claims, 9 Drawing Figures

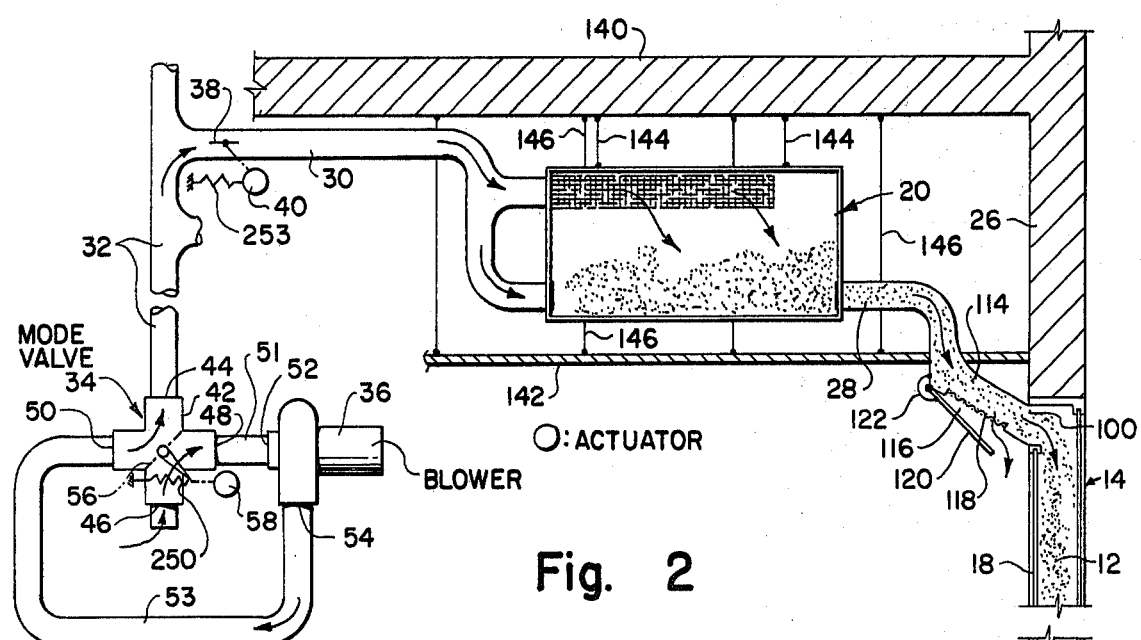
Fig. 2
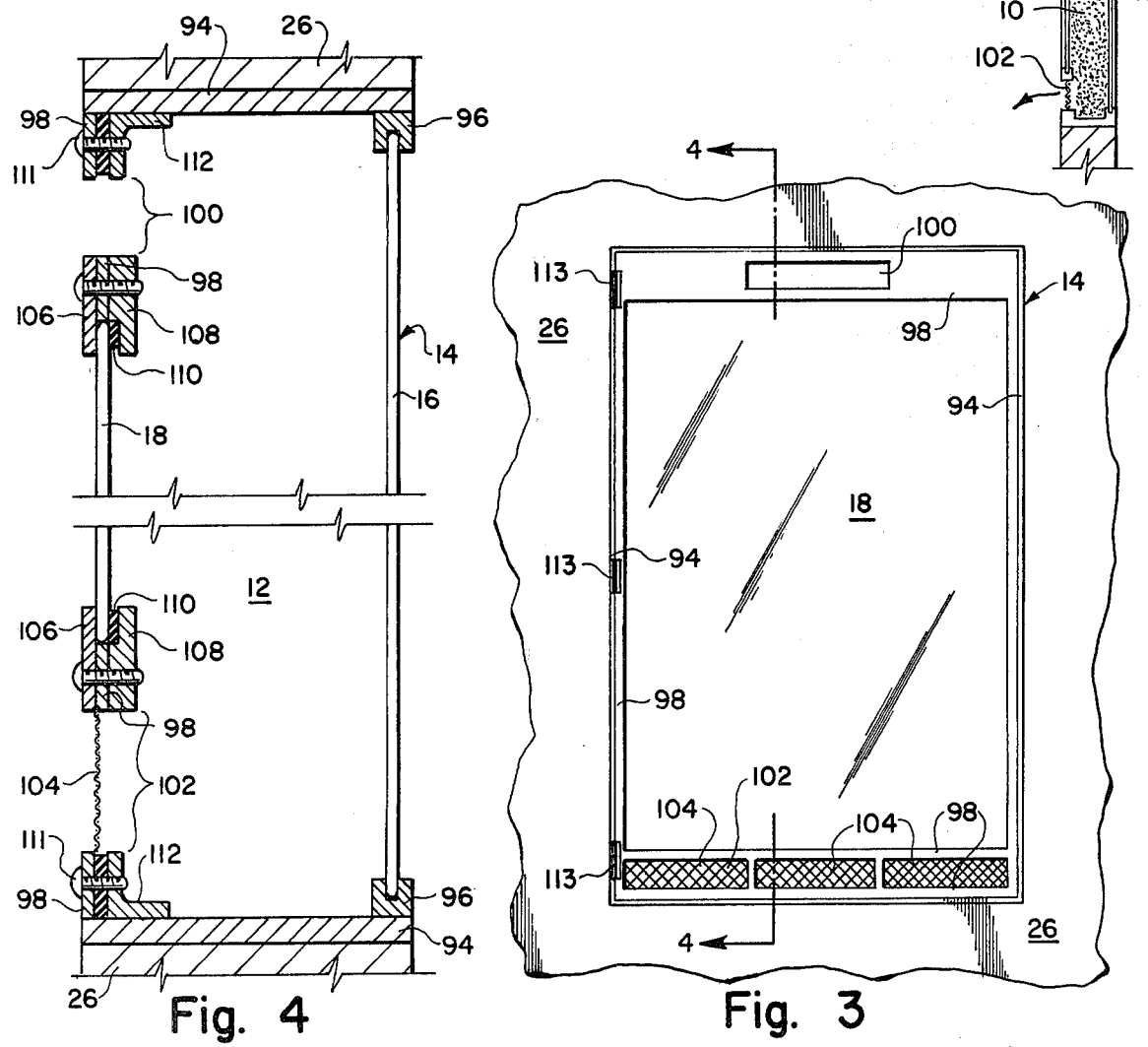
Fig. 4
Fig. 3

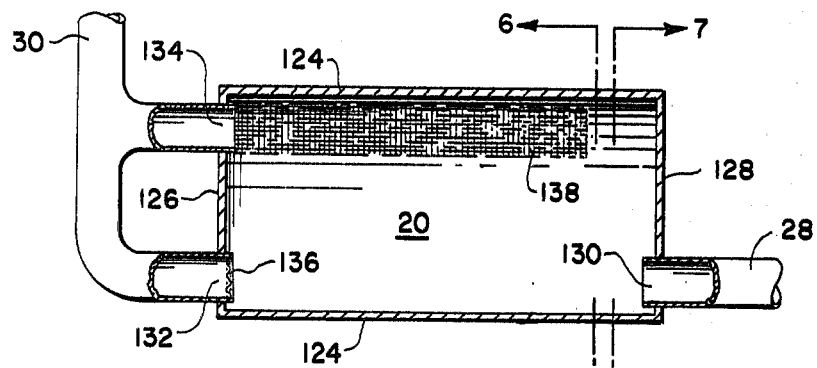
Fig. 5
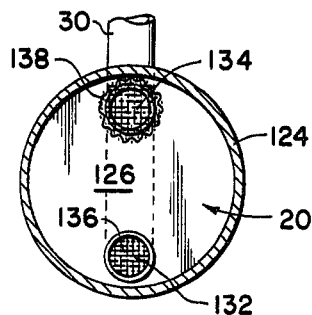
Fig. 6
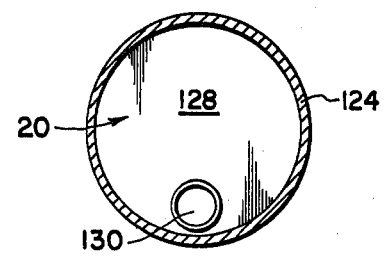
Fig. 7
Interior Temperature ($T_I$)
|  | $T_I > T_{H_I}$ | $T_{H_I} > T_I > T_{L_I}$ | $T_{L_I} > T_I$ |
|---|---|---|---|
| $T_E > T_{H_E}$ | 0 | 0 | 1 |
| $T_{H_E} > T_E > T_{L_E}$ | 1 | 1 | 1 |
| $T_{L_E} > T_E$ | 1 | 0 | 0 |
Exterior Temperature ($T_E$)
0 — LOW — Fill signal on conductor 196
1 — HIGH — Empty signal on conductor 196
Fig. 9

CONTROLLABLE INSULATING EFFECTS BY SELECTIVE INTERPOSITION OF INSULATING PARTICLES IN A CAVITY OF AN ENERGY TRANSMISSION PANEL ASSEMBLY

BACKGROUND

This invention pertains to energy conservation apparatus, systems and methods for use in dwelling and office structures to reduce the heat load loss and heat load gain as a result of undesired heat energy transmission through windows or other energy transmission panel assemblies at the exterior surface of the structure. More particularly, the present invention pertains to selectively interposing a quantity of particulate insulating material in a cavity adjacent the window or transmission panel to block the heat energy transmission therethrough, and to removing the insulating material from the cavity to allow heat energy transmission therethrough under predetermined desirable conditions.

Systems which selectively fill and empty a window chamber or cavity between two energy transmission panels or windows in order to control the heat energy transmission therethrough are known in the art. The limited prior use and adaptation of such prior art systems have indicated a need for practical improvements and enhanced functional features.

Among other matters, certain prior art systems have evidenced only a limited effectiveness in quickly, completely and reliably filling and emptying the cavities of the energy transmission panel assemblies. Of course, incomplete control over filling and emptying the cavities tends to detract from the desirable insulative features available. Primary reasons for the limited effectiveness of such prior art systems are their relatively complex nature and an inefficient use of component elements. Such prior art systems typically require numerous components which are susceptible to unreliable operation and to failure. In some circumstances separate control devices are used to perform limited specific individual functions, resulting in duplication. For example, separate blowers are needed to create both vacuum and positive air flow to transport the insulating material in opposite directions. Prior art systems take the form of single integrated structural units wherein the blower and suction devices, the storage bins, the energy transmission panel assemblies, check valves, and the extensive plumbing are all structurally housed within a single unit. Such a single unit usually is very space-consuming, detracts from the interior design of the building because of its size, requires an oversized opening in the exterior wall of the building structure for installation, and has a relatively high cost per effective use area due to the large amount of equipment dedicated only to a single unit. Another form which prior art systems take is a plurality of transmission panel assemblies dispersed remotely from a single storage bin and blower and suction device. Insulating material from the single storage bin is dispersed to each of numerous energy transmission panel assemblies. Problems with this prior art embodiment have arisen typically because the building space consumed by the storage bin and blower and suction devices is relatively large, the distance over which the insulating material must travel between the single storage bin and the multiple panel assemblies is large thereby limiting the air transmission characteristics of the system, the effectiveness in emptying and filling a multiplicity of the cavities at the same time is limited due to a lack of precise control over each individual cavity, and the blower and suction devices and plumbing must have a significantly large capacity to transport the particulate insulating material over long distances to multiple panel assemblies. Other restrictive features of such prior art arrangements are appreciated by those skilled in this particular art.

SUMMARY

It is the general objective of this invention to provide a new and improved system and method for selectively and removably interposing a quantity of particulate insulating material in a cavity adjacent a transmission panel in a heat energy transmission path through the panel. According to this aspect of the present invention, the means defining the cavity is provided with an aperture communicating with the upper portion of the cavity through which the particulate insulating material flows when filling or emptying the cavity. A vent communicates with a lower portion of the cavity. A mode selection valve means is operative in conjunction with a blower means to reversibly and selectively utilize the typical gas or air flow from the blower means to create either positive pressure air flow or suction pressure air flow. Flow conduction means conducts the air flow between the storage chamber and the cavity. A system control means operates the mode selection means and air is directed from the storage chamber toward the cavity, and particulate insulating material is transported through the aperture into the cavity. Alternatively, the control means operates the mode selection means to create a suction flow of air from the cavity toward the storage chamber. Air enters the cavity through the lower vents, flows upwardly through the particulate insulating material and carries the particulate insulating material out of the aperture into the storage chamber. The control means includes functional elements which sense the temperature in at least one but preferably both environments on opposite sides of the panel assembly and compare the temperatures sensed to a predetermined range of interior and exterior temperatures. The control means operatively and automatically controls the status of the cavity, either empty or filled, in accordance with a relationship of the sensed temperatures relative to the predetermined ranges of interior and exterior temperatures. Each cavity is thereby automatically emptied or filled in relation to the interior and exterior temperatures and the effectiveness in reducing heat load gain or heat load loss is increased.

Another objective of the present invention is to provide a new and improved energy transmission panel assembly which more effectively empties of or fills with particulate insulating material. In accordance with this aspect of the invention an air flow diverting means is provided in conjunction with the upper aperture and the lower vents. The air flow diverting means substantially diverts the majority of the positive pressure air flowing toward the cavity to the exterior of the cavity at a location adjacent the aperture. The cavity is filled as a result of the momentum imparted by the air stream to the particulate insulating material. Positive pressure air is not, therefore, forced into the cavity to stir or mix the insulating particles or to create a back pressure to the continued high flow rate of air and insulating material. The air flow diverting means, however, confines suction pressure air flow from the cavity to the flow conducting means rather than divert the suction flow pressure to the ambient environment. The suction flow is present at the upper aperture of the cavity. The vents communicating with the lower portion of the cavity present a relatively large cross sectional area through which ambient pressure air enters the lowermost portion of the cavity. A relatively large supply of ambient pressure air flows through the vents and into the interstices between the particles of insulating material, and the significant ambient pressure air loosens and lifts the particles out of the cavity through the aperture. The relatively large cross sectional area of the vents assures that sufficient ambient air flow enters the cavity to quickly and effectively remove all of the insulating particles rather than leave remaining particles behind as a result of channels of narrowly confined air flowing from one specific point to another.

Another objective of the present invention is to provide a new and improved storage chamber and a new and improved method of locating the storage chamber for use with a transmission panel assembly. According to this aspect of the invention, the storage chamber is preferably positioned in the typically existing and unused space between a suspended ceiling and the upper building structure such as an upper floor. The storage chamber can thereby be placed in close proximity to the panel assembly, and the distance that the particulate insulating material must be transported is reduced. Accordingly, less air flow force and a smaller capacity blower can be utilized. According to another aspect of the invention, the storage chamber is preferably defined by a cylindrical enclosure having an axis extending horizontally. One end of the enclosure is provided with a first port at a lowermost position for communicating the particulate insulating material between the storage chamber and the cavity. The other second and third ports are vertically spaced in the other end of the enclosure at a lowermost and uppermost position, respectively. Screen covers extend over the second and third ports, and the screen cover over the uppermost third port presents a substantially large cross sectional area through which air may flow. As the storage chamber fills with particulate insulating material the relatively large cross sectional area of the upper screen cover assures a continued high rate of suction pressure air flow out of the storage chamber even when the particulate insulating material builds up to the upper screen member. The lowermost ports are aligned with one another and the positive pressure air issuing from the second port tends to clean or sweep the remaining insulating particles which have been channeled to the lowermost portion of the storage chamber into the first port communicating with the cavity. The storage chamber presents a more effective and efficient arrangement for collecting and holding the insulating particles and for delivering the particles to the cavity.

It is another objective of the invention to provide a new and improved control system and arrangement for automatically and individually filling or emptying each of a plurality of panel assemblies which have been grouped into associated panel groups. A branch valve operatively controls the flow communication path between the blower means and each storage chamber operatively associated with each panel assembly. Opening and closing each branch valve thereby causes the flow communication to be directed to only one panel assembly at a time thereby quickly and totally emptying or filling its cavity. Each panel assembly of the associated panel group is accessed one at a time to change the status or condition of each panel in the associated group. Each of the associated panel groups includes its own temperature sensors and each of the associated panel groups is individually controlled to establish its best desirable status according to the temperatures which the panel group experiences. Accordingly, associated groups on different exposures of the building, for example, may be selectively filled or emptied in accordance with the temperature conditions existing at the particular location of the associated group. A single blower assembly and mode selection means exercises control over a number of associated groups of panel assemblies therey reducing the cost of the system. Each of the associated panel groups is addressed automatically in order, and the condition of those panel assemblies of an associated group is changed when a change of status is detected. This approach to preventing undesirable heat load loss or heat load gain substantially improves the performance of the system as a whole in a dwelling or office structure and reduces the amount of energy necessary to heat or cool such a structure.

A further objective of the present invention is to provide a new and improved arrangement for creating and directing the positive pressure air flow in one direction or the suction pressure air flow in the other direction. In accordance with this aspect of the invention, the mode selection means is provided. The mode selection means allows a conventional blower means operating in a single flow direction to be utilized for creating both types of air flow. The control system of the present invention quickly and accurately operates the mode selection means to achieve the desired effects. The number of components of the present system is thereby not unduly multiplied.

Numerous other significant and important advantages and improvements are comprehensible to those skilled in the art as a result of the present invention which is next exemplarily described in conjunction with a preferred embodiment and drawings.

BRIEF DESCRIPTION OF THE DRAWINGS

FIG. 2 is an abbreviated view of certain components of the system shown in FIG. 1, shown in the condition of filling the cavity of the energy transmission panel assembly with particulate insulating material.

FIG. 3 is a front elevational view of one embodiment of an energy transmission panel assembly of the present invention.

FIG. 4 is a vertical section view taken substantially in the plane of line 4—4 of FIG. 3.

FIG. 5 is an enlarged vertical section view of a storage chamber also shown in FIGS. 1 and 2.

FIG. 6 is a vertical cross section view taken substantially in the plane of line 6—6 of FIG. 5.

FIG. 7 is a vertical section view taken substantially in the plane of line 7—7 in FIG. 5.

FIG. 9 is a logical truth table illustrating the operation of certain elements illustrated in FIG. 8 which define a logical status determining means.

PREFERRED EMBODIMENT

Figure 1:
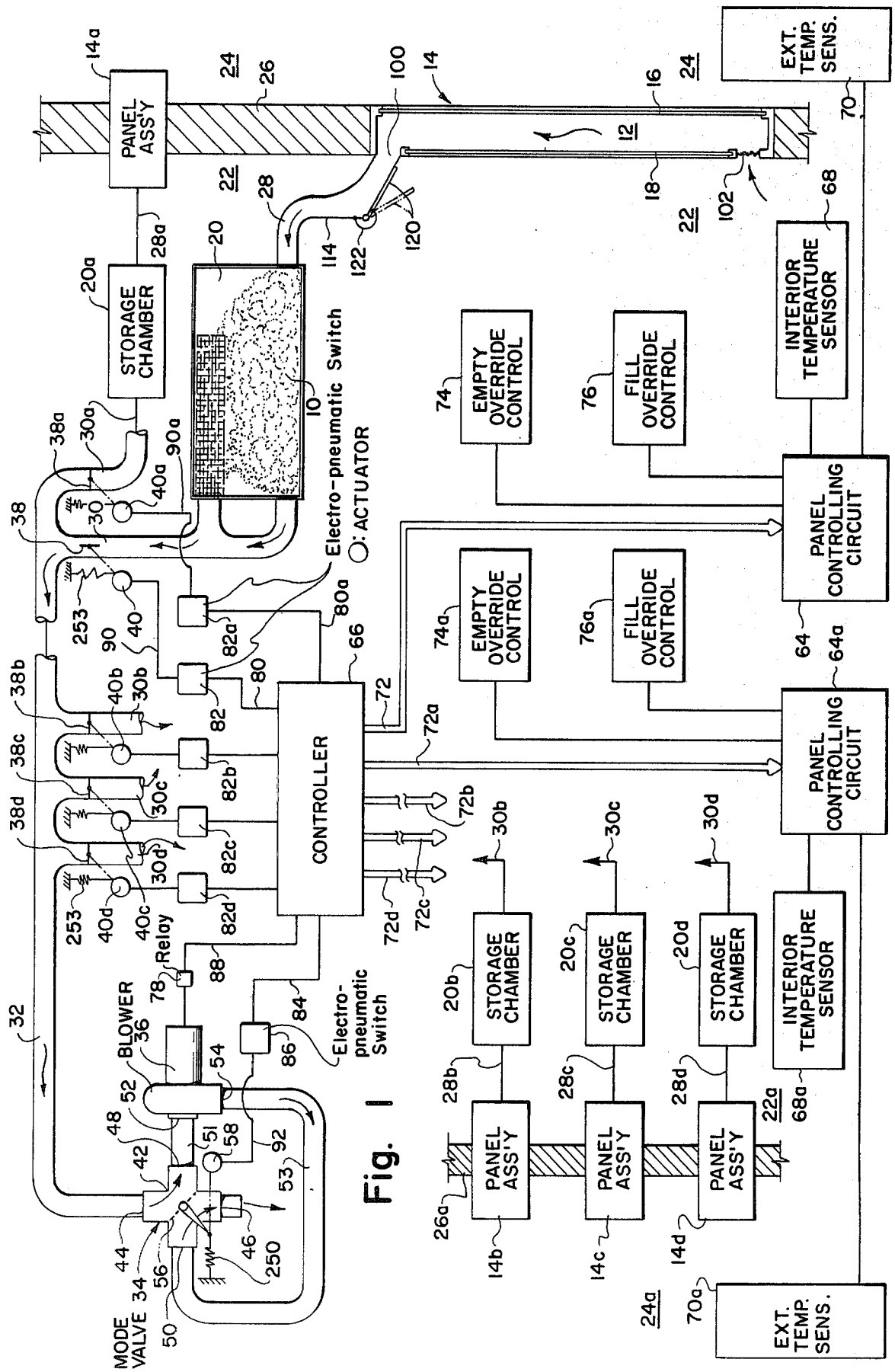
FIG. 1 is a schematic and block diagrammatic and limited mechanical view of components of the preferred embodiment of the present invention, shown in the condition of removing particulate insulating material from the cavity associated with an energy transmission panel assembly.

The general features and structural components of a presently preferred system according to the present invention are generally introduced by reference to FIG. 1. The system of the present invention pertains to selectively interposing a quantity of dry particulate insulating material, generally referenced 10, in a cavity 12 defined in an energy transmission panel assembly 14. The panel assembly 14 comprises a pair of spaced apart energy transmission panels 16 and 18, such as window glazings or panes of glass. The cavity 12 is formed in the space between the panels 16 and 18. In one condition or status, the cavity 12 is empty of particulate insulating material 10, in which case the particulate insulating material 10 will be housed and contained within a storage chamber 20 and an energy transmission path will exist through the panels 16 and 18 and between an interior and an exterior environment 22 and 24, respectively, of a building 26. When it is desired to prevent or substantially impede the transmission of energy in the path through the panels 16 and 18, the cavity 12 is filled with the insulating material 10, in which case the cavity 12 will exhibit the other condition or status.

The particulate insulating material 10 is carried between the cavity 12 and the storage chamber 20 by a flow of gas, preferably air, conducted through flow conducting means which include a conduit 28, an air or branch duct 30, a manifold 32, and a mode selection means or valve 34. A blower 36 supplies the flow of gas or air, and the mode selection valve 34 controls the direction in which air flows through the manifold 32, the branch duct 30 and the conduit 28. The direction in which air flows between the cavity 12 and the storage chamber 20 determines the direction in which the particulate insulating material is transported and thus the status of the cavity 12, i.e., whether it is emptied of or filled with insulating material 10.

The particulate insulating material 10 is preferably small beads of expanded styrofoam which have been treated to eliminate or reduce the capacity for holding static electricity. The particles or beads of styrofoam insulating material are of size and weight limitations which readily allow them to be transported by the air flow available and supplied by the blower 36. The insulating material should exhibit good insulating characteristics to prevent or substantially impede the convection and conduction of thermal energy in the energy transmission path, as well as the radiation of the thermal energy.

Air flow is directly communicated between the cavity 12 and the storage chamber 20 through the conduit 28. One storage chamber 20 is preferably connected in direct flow communication with each cavity 12 of the panel assembly 14. The storage chamber 20 is fluid-tight and communicates air flow therethrough between the conduit 28 and the branch duct 30. The branch duct 30 extends directly between the storage chamber 20 and the main manifold 32. A controllable branch valve assembly 38 is positioned in the branch duct 30 between the manifold 32 and the storage chamber 20, and the branch valve 38 operatively controls the air flow communication through the branch duct between the manifold and the storage chamber. A branch valve actuator means 40 is operatively connected to the branch valve 38 and moves the branch valve to an open position in which air flows between the manifold 32 and the storage chamber 20, or to a closed position in which air flow communication between the storage chamber and the manifold is prevented.

The direction of air flow through the manifold 32, branch duct 30, storage chamber 20, and conduit 28 is controlled by the mode selection valve 34. The mode selection valve 34 comprises a junction or union structure 42 defining four ports: a first port 44 which is connected to the manifold 32; a second port 46 which is connected to the ambient environment or atmosphere; a third port 48; and a fourth port 50. The third port 48 of the union structure 42 is connected by a conduit 51 to an inlet 52 of the blower 36. The fourth port 50 is connected by a conduit 53 to an outlet 54 of the blower 36. As is typical, the blower 36 functions to receive a flow of air or gas at less than ambient pressure at its inlet 52 and deliver a flow of air or gas at an elevated pressure from the outlet 54. A suction pressure, with respect to the ambient, is created at the inlet 52 and a positive pressure, with respect to the ambient, is created at the outlet 54.

A butterfly valve member 56 is pivotably retained at the center junction of the union structure 42. The butterfly valve member 56 is connected to and operatively moved by a mode valve actuator means 58. The mode valve actuator means 58 moves the butterfly valve 56 between first and second positions illustrated respectively in FIGS. 1 and 2.

In the first operative position of the mode selection valve 34, shown in FIG. 1, the butterfly valve 56 is positioned so that the first port 44 and the third port 48 are connected in a direct flow communication path, the second port 46 and the fourth port 50 are connected in a direct flow communication path, and the flow path between the first and third ports is separated and isolated from the flow path between the second and fourth ports. The inlet 52 of the blower 36 operatively communicates with the manifold 32 and the blower outlet 54 operatively communicates with the ambient atmosphere. A suction is created in the manifold by operation of the blower and air flows from or out of the manifold 32 into the blower inlet.

In the second operative position of the mode selection valve 34, shown in FIG. 2, the butterfly valve 56 is positioned so that the first port 44 and the fourth port 50 are connected in a direct flow communication path, the second port 46 and the third port 48 are connected in a direct flow communication path, and the flow path between the first and fourth ports is substantially separated and isolated from the flow path between the second and third ports. The blower outlet 54 operatively communicates with the manifold 32 and the blower inlet 52 operatively communicates with the ambient atmosphere. A positive pressure is created in the manifold and air flows into the manifold from the blower outlet.

In order to remove particulate insulating material 10 from the cavity 12 of the panel assembly 14 and transport it to the storage chamber 20, the mode valve 34 is operated to its first position illustrated in FIG. 1. A flow of air is suctioned from the main manifold 32, the branch duct 30, the storage chamber 20, the conduit 28 and the cavity 12. The air flowing out of the cavity 12 into the storage chamber 20 lifts or otherwise transports the particulate insulating material 10 from the cavity into the storage chamber 20, as shown in FIG. 1. Once all of the particulate insulating material has been transported from the cavity 12 into the storage chamber 20, a relatively unimpeded energy transmission path exists through the panel assembly 14 and the energy transmission panels 16 and 18.

In order to transport the particulate insulating material 10 from the storage chamber 20 into the cavity 12, the mode selection valve 34 is operated to its second position illustrated in FIG. 2. A flow of air is forced into the manifold 32 and through the branch duct 30, the storage chamber 20, and the conduit 28 to the panel assembly. Air flowing through the storage chamber 20 picks up and carries the particles of insulating material and deposits the insulating material into the cavity 12 of the panel assembly 14. The filled cavity blocks or substantially impedes energy transmission along the path through the energy transmission panels 16 and 18. When filled with particulate insulating material, the panel assembly 14 reduces the heat load gain or heat load loss between the interior environment 22 and the exterior environment 24 of the building 26.

The system according to the present invention contemplates a multiplicity of panel assemblies 14, storage chambers 20, conduits 28, branch ducts 30, branch valves 38 and branch valve actuator means 40. Each of these additional elements, however, are substantially the same as and correspond with those elements which have previously been described. Four complete sets of additional panel assemblies, storage chambers, conduits, branch ducts, branch valves and branch valve actuator means have been shown in block diagram form in FIG. 1 and are referenced by corresponding numerals differing only in the alphabetical subscripts a, b, c and d. Although shown primarily in block diagram form, these elements function in the same manner as has been previously described with respect to the corresponding elements designated by numerals not bearing alphabetical subscripts.

A control system or means operatively controls the operation of the blower and the operative positions of the mode selection valve 34 and branch valves, in order to fill the cavities 12 of the panel assemblies with particulate insulating material 10, or alternatively, to empty the cavities 12 of particulate insulating material. The control system or means comprises at least one panel controlling circuit 64 and a controller 66, shown in FIG. 1. Preferably however, a plurality of panel controlling circuits are provided, e.g. 64 and 64a, and each of the panel controlling circuits is operatively connected to the single controller 66. Each panel controlling circuit is operatively associated with at least one panel assembly, but preferably, each panel controlling circuit is associated with a group or plurality of panel assemblies. For example, the panel controlling circuit 64 is operatively associated with the associated group of panel assemblies defined by the individual panel assemblies 14 and 14a. The panel controlling circuit 64a is operatively associated with the associated group of panel assemblies defined by individual panel assemblies 14b, 14c and 14d.

The general function of each panel controlling circuit is to operatively determine whether the cavities of each panel assembly of its operatively associated group should be filled with particulate insulating material or emptied of particulate insulating material in order to reduce the heat load gain or the heat load loss and to control the operations creating a change in status of the cavities. In order to determine the most desirable status of each cavity of each panel assembly in the group, i.e. either filled or empty, each panel controlling circuit 64 includes at least one temperature sensor means 68 or 70 operatively positioned in the interior environment 22 or the exterior environment 24 in the vicinity of the associated group of panel assemblies. Preferably however, both an interior temperature sensor 68 and an exterior temperature sensor 70 are utilized. The interior temperature sensor 68 is located in the interior environment 22 and in the vicinity of or adjacent to its associated group of panel assemblies 14 and 14a. The exterior temperature sensor 70 is located exterior of the building 26 in the exterior environment 24 in the vicinity of or adjacent to its associated group of panel assemblies 14 and 14a. The sensors 68 and 70 are conventional devices which supply signals to the panel controlling circuit 64.

The signals supplied by the sensors 68 and 70 exhibit a predetermined relationship with the temperature sensed in the environments 22 and 24, respectively. The signals from the sensors 68 and 70 are utilized in automatically and logically determining whether each of the cavities 12 of the panel assemblies of the operatively associated group should be filled with or emptied of particulate insulating material. The logical determination occurs in accordance with a predetermined and pre-established relationship of the sensed temperatures to predetermined exterior and interior temperature limits. The predetermined interior and exterior temperature limits define predetermined ranges of interior and exterior temperatures by which conditions for filling the cavities can be established in order to reduce the heat load gain or heat load loss.

When the panel controlling circuit 64 determines that a change in the status of each cavity 12 of its associated group of panel assemblies is desired, the circuit 64 delivers control signals over a signal conducting bus 72 to the controller 66. In response to the control signals, the controller 66 actuates the blower 36, moves the mode selection valve 34 to the proper determined position and opens the branch valves of the associated group of panel assemblies one at a time. The status of each cavity of the associated group of panel assemblies is changed while its branch valve is open, until all of the cavities of the group are changed to the same status. To override the automatic effects of the panel controlling circuit 64, override controls 74 and 76 are provided to respectively cause the cavities of the associated group of panel assemblies to be emptied of or filled with particulate insulating material.

The panel controlling circuit 64a, its associated temperature sensors 68a and 70a, and its override controls 74a and 76a operate similarly with respect to the associated group of panel assemblies 14b, 14c and 14d, as the circuit 64 and its associated elements do with respect to its group of associated panel assemblies 14 and 14a.

In accordance with the control signals present on the buses, e.g. 72, the controller 66 supplies actuation signals on conductors 80 and 80a to electro-pneumatic switch devices 82 and 82a respectively, and over conductor 84 to an electro-pneumatic switch device 86, and over a conductor 88 to a blower relay 78. Electrical actuation signals supplied over conductors 80 and 80a actuate the electro-pneumatic switches 82 and 82a. The switches 82 and 82a deliver pneumatic signals through conduits 90 and 90a to the branch valve actuator means 40 and 40a, respectively. Similarly, electrical actuation signals supplied on conductor 84 operate the electro-pneumatic switch 86, and pneumatic signals are delivered over a conduit 92 to the mode valve actuator means 58. Electrical actuation signals on conductor 88 directly activate the blower relay 78 to electrically energize the blower 36. The actuator means 40 and 58 are conventional pneumatic piston and cylinder mechanisms which are mechanically connected to the valves which they control. The pneumatic signals supplied to the actuator means operate the piston within the cylinder assembly to move the valve to the selected position.

Each panel group is addressed in order by the controller 66 to determine whether changes in the status of the cavities of the panel assemblies of that associated group is automatically called for or has been manually selected for change. Addressing each panel group occurs by allowing the control signals present on the associated bus 72, 72a, 72b, 72c, 72d, etc. to have an operative effect on the controller 66. After all the panel groups have been addressed in order, the original first panel group is again addressed and the sequence repeated. For those panel groups which do not require a change in the status of the cavities, the next panel group is immediately thereafter addressed. Once a panel group which requires a status change has been addressed, each panel assembly of that group is individually accessed by opening the branch valve associated with that panel assembly so that air flow in the appropriate direction between the panel assembly and the storage chamber will effect the desired change in status. Each of the panel assemblies in the associated panel group is similarly accessed in order until a change in status in all of the panel assemblies of that panel group has been achieved.

The different panel groups are typically located at different locations in a building. For example, one panel group may be defined by the panel assemblies along the southern exposure of the building and another group of panel assemblies may be located along the northern exposure. The temperature conditions in the vicinity of one group of panel assemblies may be different than the conditions in the vicinity of another group of panel assemblies. The differing conditions at different locations may require the cavities of different panel groups to exhibit different status. The panel controlling circuits operatively determine the most desirable status and the controller operatively causes the status of the cavities of each panel assembly of an associated group to attain that condition which reduces heat load gain or loss.

The nature and operation of the panel assemblies 14, the storage chambers 20, the panel controlling circuits 64 and the controller 66 are better understood from the following more detailed description of these individual aspects of the present embodiment and invention.

The panel assembly 14 is illustrated in greater detail in FIGS. 3 and 4. The panel assembly 14 includes a frame member 94 securely attached within an opening extending through an exterior wall of the building 26. The frame member 94 may be a pre-existing window frame or may be specifically constructed for the panel assembly 14. An exterior window pane or glass 16, or other energy transmission panel, is attached to and retained within the frame member 94 by conventional retention means 96. An interior window pane or glass 18, or other energy transmission panel, is retained at a position interiorly spaced from the exterior window glass 16 by an interior cover and peripheral support structure 98. The support structure 98 is operatively attached to the frame member 94. The cavity 12 is defined horizontally from the exterior window glass 16 to the interior window glass 18 and its support structure 98, and vertically between the upper and lower portions of the frame member 94. The energy transmission path is defined by a path through the interior window glass 16, the cavity 12 and the exterior window glass 18.

In order to communicate the particulate insulating material into and out of the cavity 12, an aperture 100 is defined by and extends through an upper portion of the support structure 98 at a position communicating with the uppermost position of the cavity 12. As shown in FIG. 3, the aperture 100 has a predetermined cross sectional area. In order to complete an air flow path vertically through the whole of the cavity 12 under certain conditions of operation, at least one but preferably a plurality of vents 102 are formed in the support structure 98 communicating with the cavity 12 at a lowermost position. Each of the vents 102 has a predetermined cross sectional area, and the total cross sectional area of the vents 102 is substantially greater than the cross sectional area of the aperture 100, as is apparent from FIG. 3. A screen 104 extends over each of the vents 102 and serves as filter means for allowing the passage of air therethrough while preventing the passage of particulate insulating material therethrough. The aperture 100 does not include a similar screen or filter means.

Retention block members 106 and 108 are connected on opposite sides of the support structure 98 to hold the interior window glass 18 to the support structure 98. Resilient material 110 is positioned between the retention block 112 and the interior window glass 18 to allow certain flexibility and prevent window breakage. The screen 104 is clamped between the lower block 108 and the support structure 98 and between the support structure 98 and a bracket 112 connected to the lower portion of the frame 94. Other similar brackets 112 are attached at other points around the window frame 94, and the peripheral edges of the support structure 98 are retained by screws 111 or other fastener means to the brackets 112. Preferably the support structure 98 is pivotably connected by one or more hinges 113 along one vertical peripheral edge to the frame member 94 to allow the support structure 98 and the attached window glass 18 to swing open and expose the interior elements of the cavity 12 for access or cleaning. Before pivoting the support structure 98 open from the frame member 94 at the hinges 113, the screws 111 and the conduit adaptor 114, described below, must be removed.

A conduit adaptor 114 operatively connects the cylindrical conduit 28 to the rectangularly-shaped aperture 100, as is shown in FIGS. 1 and 2. The adaptor 114 serves as an extension segment of the conduit 28 and operatively completes the flow communication path between the interior of the conduit 28 and the cavity 12 through the aperture 100. As shown in FIG. 2, a communication passageway or opening 116 is formed through the adaptor 114 into the ambient environment 22 exterior of the panel assembly. A screen 118, or other filter means, extends across the opening 116 and prevents the particulate insulating material from passing through the opening 116 into the ambient environment 22 but allows gas to pass therethrough. A door 120 is hingeably connected to the adaptor 114 at the edge of the opening 116. Biasing means in the form of a spring 122 operatively and normally biases the door 120 to a closed position in which the door covers and seals the opening 116 to prevent the flow of air therethrough, as is shown in FIG. 1. In the open position of the door 120 shown in FIG. 2, an air flow communication path extends through the opening 116. The door 120 serves as a valve member or blocking means for blocking the flow of air through the opening 116 in its closed position and allowing the flow of air through the opening 116 in the open position.

The opening 116 and the door 120 and the spring biasing means 122 define one example of an air flow directing means. The air flow directing means is operative in response to a predetermined positive pressure within the conduit 28 and cavity 12 to divert air flowing toward the cavity into the ambient atmosphere through the opening 116, but is operative to substantially confine to the conduit air suctioned from the cavity into the conduit. This operation facilitates emptying and filling the cavity.

When it is desired to remove the particulate insulating material from the cavity 12, by creating a suction in the conduit 28, as shown in FIG. 1, the door 120 is initially biased to the closed position thereby blocking the opening 116 and causing the suction to be communicated into the cavity 12. The suction or reduced pressure at the upper portion of the cavity is counteracted by atmospheric air entering the cavity through the vents 102. An air flow upward through the cavity 12 and the insulating material is created, and the upward air flow lifts particles of insulating material out of the cavity and into the conduit 28. The suction in the conduit 28 holds the door 120 closed and the blocked opening 116 assures a continuous suction in the cavity and flow path from the cavity 12 through the aperture 100 into the conduit 28. Air enters the cavity 12 through the vents 102 to replace that air flowing out of the cavity 12. The larger cross sectional area of the vents 102, as compared to the aperture 100, provides an increased area of application of atmospheric pressure to the insulating material resting against the screen 104. The larger area through which atmospheric air enters the cavity tends to separate the particles of insulating material and create interstices between the particles. Sufficient air flow enters the cavity, and the insulating particles at the upper levels are lifted upwardly out of the cavity 12 through the aperture 100 and communicated into the storage chamber 20.

The upward air flow from the lowermost portion to the uppermost portion of the cavity creates sufficient drag force on the lightweight particulate insulating material to remove all of the material from the cavity 12. The relatively large cross sectional area of the vents 102 assures that sufficient air flow enters the cavity. The relatively large area of the vents spreads the air flow throughout the whole cavity and prevents the channeling of narrow streams directed only through limited locations of the relative large cavity 12. This arrangement is in significant distinction to certain prior art arrangements which rely on gravity to remove the particulate insulating material downward through a selectively mechanically opened trap in the lowermost portion of the window chamber or cavity. The gravity force on a small, lightweight particle of insulating material is very small and is easily overcome by slight resistence such as static electricity or natural attraction. Consequently, gravity-return prior art arrangements are typically incapable of achieving the rapid and complete emptying of the cavity available from the present system.

When it is desired to fill the cavity 12 with particulate insulating material, as illustrated in FIG. 2, positive pressure air flows from the manifold 32 through the duct 30 and storage chamber 20 and conduit 28. The air initially flows through the aperture 100 into the cavity 12 because the door 120 is biased to the closed position sealing the opening 116. All of the air flow is thus initially directed into the cavity 12 and carries the particulate insulating material from the storage chamber 20 into the cavity. Initially, air exits from the cavity 12 through the vents 102 into the interior ambient atmosphere and environment 22 as air enters through the aperature 100. As soon as sufficient particulate insulating material collects in the lower portion of the cavity 12, the air flowing through the vents 102 is substantially restricted or terminated. At this point, the air pressure within the cavity 12 and conduit 28 increases to the magnitude at which the air pressure creates sufficient force on the door 120 to overcome the bias of the spring 122. The door 120 opens, as shown in FIG. 2, and a flow path through the opening 116 into the ambient environment 122 is established. The substantial majority of air flowing in the conduit 28 exits through the opening 116, rather than flow into the cavity 12. The screen 118 retains the particulate insulating material within the adaptor 114. The momentum of the particulate insulating material carried by the air stream causes the particulate insulating material to continue onward into the cavity 12 through the aperture 100 even though the air flow exits through the opening 116 before reaching the cavity.

The air flow directing means, defined by the opening 116, the screen 118 and the biased door 120, provides substantial improvements over prior art arrangements which require a continued influx of both air and particulate insulating material into the cavity or window chamber during the filling operation. Such prior art arrangements have difficulty in completely filling the cavity because a substantial back pressure or force on the relative free flow of air and particulate insulating material into the cavity occurs due to inefficient venting. Consequently, a substantially long period of time is required to fill the cavity with particulate insulating material, or the cavity does not completely fill because the air flow is reduced to a rate at which transportation of the particulate insulating material is no longer effective. By the present arrangement a continued high air flow is available to transport the particulate insulating material toward the cavity 12 and the momentum of the particulate insulating material causes the cavity to fill completely even though the substantial majority of the air flows through the flow path defined through the opening 116 by the open door 120. The cavity fills uniformly and smoothly because no substantial air currents are present in the cavity to stir the insulating particles about or to cause uneven accumulations in one location in the cavity as compared to another location.

The details of the storage chamber 20 and an appreciation of its significant improvements are best shown and understood by reference to FIGS. 5, 6 and 7. The storage chamber 20 is defined by an enclosure defining means preferably taking the form of a cylindrically-shaped sidewall structure 124 to which circular disc-like ends 126 and 128 are connected. The disc ends 126 and 128 are sealed to the cylindrical sidewall 124 in a fluid-tight manner and the enclosure defining the storage chamber 20 is thereby sealed and fluid-tight with respect to its exterior environment. The conduit 28, which extends from the storage chamber 20 to the panel assembly, is connected and sealed to the disc end 128 at a lowermost position, shown in FIG. 7. A first port 130 is defined by an opening formed through the disc end 128, and communication between the lowermost position of the storage chamber and the conduit 28 is effected by the first port 130. The first port 130 is open to allow the communication of both air and particulate insulating material therethrough. The air duct 30, which extends between the storage chamber 20 and the manifold, is connected and sealed to the disc end 126. A second port 132 and a third port 134 are both defined by openings extending through the disc end 126. Communication from the duct 30 with the storage chamber 20 at a lowermost position and an uppermost position are provided by ports 132 and 134 respectively, as shown in FIG. 6. A screen cover 136 extends over the second port 132 and prevents particulate insulating material from entering the air duct 30, but allows air to flow therethrough. A long tubular screen member 138 extends from the third port 134 at an upper location in the storage chamber 20. The tubular member 138 is formed of screen material along its length and end and thereby presents a substantially large surface area through which air may flow into or out of the duct 30. The screen material of the member 138 prevents the particulate insulating material from entering the duct 30. The first and second ports 130 and 132 are axially aligned parallel to the axis of the cylindrical sidewall structure 124 at a lowermost position, within the storage chamber 120 as is shown in FIG. 5.

The features of the storage chamber 20 contribute to an improved ability to quickly and efficiently empty and fill the storage chamber of particulate insulating material. When suction pressure creates an air flow into the storage chamber from the cavity and particulate insulating material is carried into the storage chamber, the condition illustrated in FIG. 1, the particulate insulating material quickly fills the lower corner adjacent the screen 136 and blocks the port 132 to the flow of air therethrough. However, a high air flow out of the storage chamber is maintained through the port 134. As particulate insulating material builds up within the chamber 20, even substantially around the tubular screen member 138, a high flow of air from the storage chamber 20 into the duct 30 is maintained due to the large surface area of the member 138 which allows air to pass therethrough around the particles of insulating material. Consequently, a high air flow continues through the cavity of the panel assembly to lift and completely remove all of the particulate insulating material from the cavity and transport it into the storage chamber. The high rate of continuous air flow in the storage chamber between the port 130 and the tubular screen member 138 prevents the particulate insulating material from blocking or partially clogging the first port 130. All of the particulate insulating material from the cavity is quickly and effectively collected in the storage chamber. Of course, the storage chamber is constructed with a predetermined volume sufficient to contain and hold at least that amount of particulate insulating material necessary to completely fill the cavity of the panel assembly.

When positive pressure air flows from the manifold 30 into the storage chamber to transport the insulating particles from the storage chamber 20 into the cavity of the panel assembly, the condition illustrated in FIG. 2, the air initially flows primarily through the port 134 and through the openings of the tubular screen member 138. The particles of insulating material within the storage chamber are transported into the conduit 28 through the port 30. As the amount of particulate insulating material within the chamber 20 decreases, the remaining insulating material is channeled downwardly to the lowermost position within the chamber 20 due to the circular cross section of the cylindrical sidewall 124 (FIGS. 6 and 7). As the amount of remaining particulate insulating material decreases, at some point the air pressure in the air duct 30 at port 132 is sufficient to overcome the force of the particulate insulating material collected at the bottom of the cylindrical sidewall 124, and a blast or flow of air issues from the port 132. Since the port 132 is aligned in a direct axial parallel relation with the port 130, the blast of air directs the last remaining portion of particulate insulating material directly toward and into the opening 130. In this manner, the last remaining particulate insulating material is also effectively picked up and transported out of the storage chamber.

The arrangement of the three ports 130, 132 and 134 in the storage chamber 20 contributes to fully collecting and storing the particulate insulating material in the storage chamber and to fully emptying the storage chamber. The relatively large cross sectional area of the tubular screen member 138 assures a continued high air flow through the storage chamber as insulating material is collected therein. The port 132 provides the needed high flow rate to clean or substantially remove all the remaining insulating material from the chamber and conduct it to the panel assembly when the chamber is emptied. The cylindrical configuration of the storage chamber provides advantageous characteristics for holding the insulating material, both during filling and emptying.

The enclosure defining the storage chamber 20 is preferably formed of a lightweight material such as high structural strength paper and can be advantageously positioned within the building 26 below an upper building structural member, such as an upper floor structure 140, and above a suspended ceiling 142, as shown in FIG. 2. The enclosure defining the storage chamber 20 can be supported by conventional hanger devices 144 attached between the storage chamber enclosure and the floor structure 140. The ceiling 142 is conventional and is suspended below the upper floor structure 140 by wire members 146, as is known. The conduit 28 extends above the suspended ceiling 142 and only the adaptor 114 extends through the suspended ceiling and connects with the aperture 100 of the panel assembly. The branch ducts 30, the branch valves 38, the branch valve actuators 40, and a significant portion of the manifold 32 may also be appropriately positioned within the space between the suspended ceiling 142 and the upper floor structure 140. The mode valve 34 and blower 36 may also be positioned in the space between the suspended ceiling and the upper building structure, or may be located in a removed location.

By suspending the storage chamber 20 within the space between the suspended ceiling 142 and the upper floor structure 140, the system according to the present invention can be readily adapted to pre-existing office and dwelling structures. The storage chambers 20 can be located in close adjacency to the location of the panel assemblies 14 and the transportation distance of the particulate insulating material is thereby substantially reduced. The storage chambers 20 need not be integrated into the structure defining the panel assemblies, as is the case in certain prior art arrangements, and consequently the size of the panel assemblies of the present invention need not be significantly larger than a conventional window assembly. The system of the present invention can be readily adapted with conventional windows by simply attaching the interior window pane 18 and its support structure 98 to a conventional pre-existing window frame or jam. A conventional window pane and assembly can thereby be converted into a panel assembly according to the present invention and the substantial majority of the remaining elements of the present system can be positioned and hidden in the unused space between the upper building structure and the suspended ceiling. Certain prior art arrangements integrate the storage chamber and the blower devices into a single unit. Substantial restructuring of the building is required to achieve installation of such prior art arrangements. Such prior art systems tend to reduce the available interior space and detract from design considerations due to their bulky construction.

Figure 8:
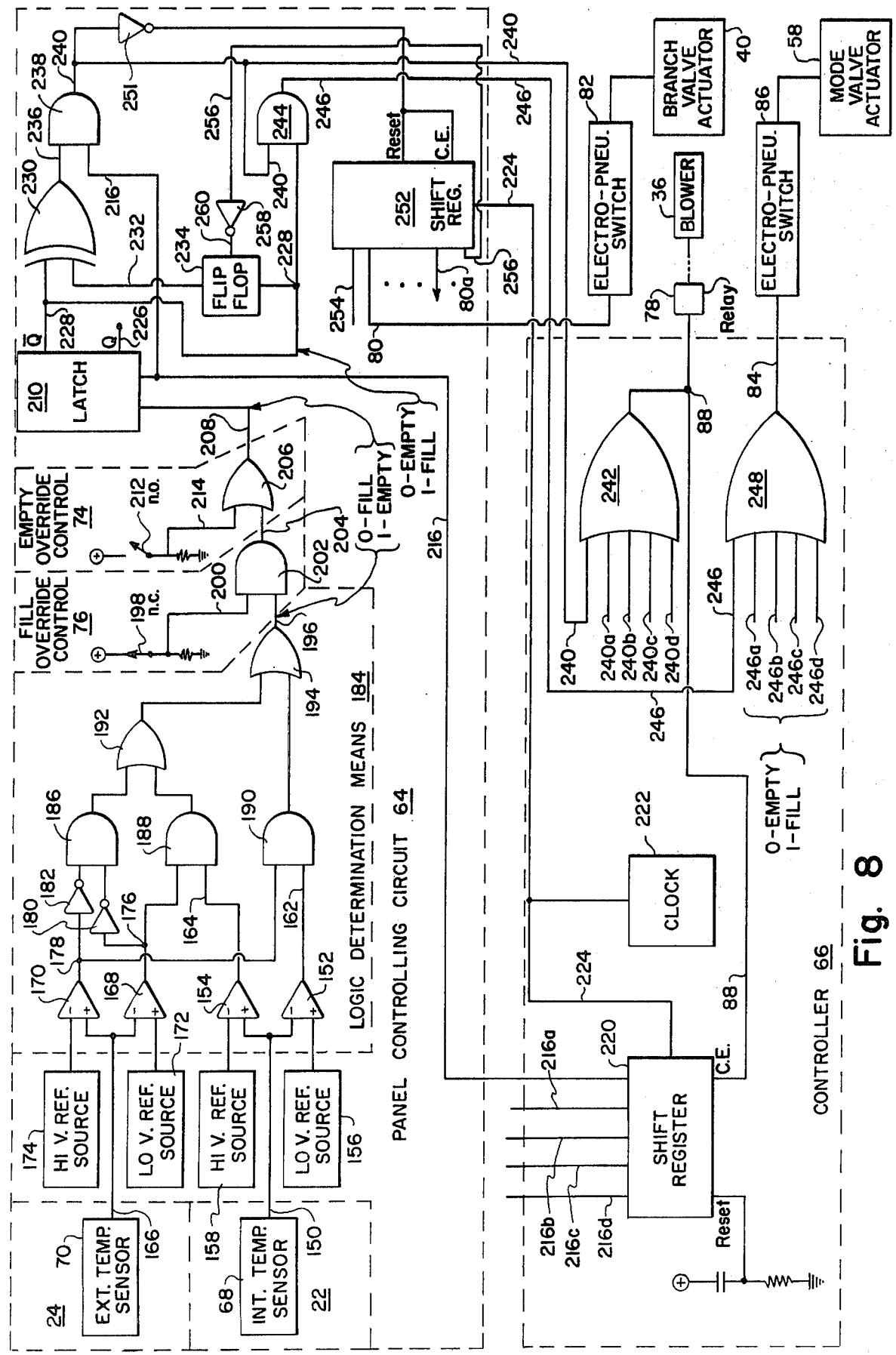
FIG. 8 is a schematic and logic diagram of one panel controlling circuit and of a controller, both of which are illustrated in block diagram form in FIG. 1.

Details of the control system or means defined by the panel controlling circuit 64 and the controller 66 are best understood by reference to FIG. 8. The interior and exterior temperature sensors, 68 and 70 respectively, are electrically connected to the panel controlling circuit 64. Each sensor supplies an electrical signal which bears a predetermined relationship to the actual temperature sensed or experienced by that sensor. The sensors 68 and 70 are conventional electrical devices which deliver a voltage signal which varies in magnitude in accordance with the temperature sensed. The signal from the sensor 68, which is representative of the interior temperature sensed, is supplied over conductor 150 to the inverting input terminal of an operational amplifier 152 and to the noninverting input terminal of an operational amplifier 154. A voltage signal from a low voltage reference source 156 is supplied to the noninverting input terminal of amplifier 152. A voltage signal from a high voltage reference source 158 is supplied to the inverting input terminal of amplifier 154. The signals supplied by the reference sources 156 and 158 are of predetermined constant magnitudes which correspond to predetermined interior temperature limits of a predetermined range of interior temperatures which defines an acceptable range of temperatures in the interior environment 22. The voltage signals from the sources 156 and 158 are related to the predetermined interior temperature limits in the same manner that the voltage output signals from the sensors 68 and 70 are related to the temperatures which they experience in their respective environments 22 and 24.

The amplifiers 152 and 154 operatively compare the temperature sensed by sensor 68 to the predetermined interior temperature limits established by the sources 156 and 158. So long as the temperature of the interior environment, as sensed by the sensor 68, is within the predetermined range of interior temperatures, the output signal from amplifier 152 on conductor 162 is low and the output signal from amplifier 154 on conductor 164 is also low. Should the interior temperature sensed by the sensor 68 drop below the lower predetermined interior temperature limit established by the low voltage reference source 156, the signal on conductor 150 is less than the voltage level of source 156. The output signal from amplifier 152 on conductor 162 is high, and the output signal from amplifier 154 on conductor 164 remains low. On the other hand, should the interior temperature exceed the upper predetermined interior temperature limit established by the high voltage reference source 158, the voltage level on conductor 150 exceeds the voltage level from the high voltage reference source 158. The output signal from amplifier 154 on conductor 164 is high, and the output signal from amplifier 152 on conductor 162 remains low.

A similar arrangement exists with respect to the exterior temperature sensor 70. The voltage signal supplied by the sensor 70 is applied to a conductor 166 connected to the inverting input terminal of an operational amplifier 168 and the noninverting terminal of an operational amplifier 170. A constant voltage level representative of a predetermined lower exterior temperature limit of a predetermined range of exterior temperatures is supplied by a low voltage reference source 172 to the noninverting input terminal of amplifier 168. A constant voltage signal representative of a predetermined upper temperature limit of the predetermined range of exterior temperatures is supplied by a high voltage reference source 174 to the inverting input terminal of the operational amplifier 170. Output signals are supplied from the amplifiers 168 and 170 on conductors 176 and 178 respectively. The amplifiers 168 and 170 operatively compare the exterior sensed temperatures with the exterior temperature limits. When the exterior temperature sensed by the sensor 70 is within the predetermined range of exterior temperatures defined by the upper and lower temperature limits (the signals from sources 174 and 172 respectively) low signals are present on conductors 176 and 178. When the exterior temperature drops below the lower predetermined exterior temperature limit, the signal on conductor 176 goes high and the signal on conductor 178 remains low. When the exterior temperature exceeds the upper predetermined exterior temperature limit, the signal on conductor 178 goes high and the signal on conductor 176 remains low. Signals on conductors 176 and 178 are respectively inverted by inverters 180 and 182.

A logical gating or determination means 184 is defined by AND gates 186, 188 and 190, and by OR gates 192 and 194, and the amplifiers 152, 154, 168 and 170. The logical gating means 184 operatively determines whether the cavity of the panel assembly should be automatically filled or emptied, in accordance with the interior and exterior temperatures sensed and compared with the predetermined ranges of interior and exterior temperatures, respectively. The AND gates 188, 190 and 186 respectively receive the pairs of signals present on conductors 164 and 176, 162 and 178, and the inversions of the signals on conductors 176 and 178.

The logic determination means 184 is operative to implement the logical truth table shown in FIG. 9. Low signals, referenced 0 in FIG. 9, are supplied by the logic determination means 184 on conductor 196 (FIG. 8) when it is desired to fill the cavity of the panel assembly or the cavities of each of the panel assemblies of the associated panel group with particulate insulating material. A high signal, referenced 1 in FIG. 9 is supplied on conductor 196 when it is desired to empty the cavity of the panel assembly or the cavities of each of the panel assemblies of the associated panel group of particulate insulating material. The signal levels shown in the truth table of FIG. 9 are supplied in accordance with the indicated relationship of the interior temperature sensed $T_I$ and the exterior temperature sensed $T_E$ to the shown predetermined relationship of the predetermined interior temperature range (defined by predetermined upper and lower interior temperature limits, $T_{HI}$ and $T_{LI}$, respectively) and the predetermined exterior temperature range (defined by predetermined upper and lower exterior temperature limits, $T_{HE}$ and $T_{LE}$, respectively).

FIG. 9 indicates that the logic determination means 184 supplies a high signal on conductor 196 when the exterior temperature $T_E$ is within the predetermined range of exterior temperatures defined by the predetermined high exterior temperature limit $T_{HE}$ and the predetermined low exterior temperature limit $T_{LE}$. Therefore, so long as the exterior temperature essentially varies within the predetermined range of exterior temperatures the cavity will be empty of particulate insulating material and the relatively unimpeded transmission of radiant energy between the interior and the exterior environments will occur. When the interior temperature $T_I$ is less than the predetermined lower interior temperature limit $T_{LI}$ and the exterior temperature $T_E$ is greater than the predetermined upper exterior temperature limit $T_{HE}$, the cavity of the panel assembly is also emptied of particulate insulating material. In this temperature condition, the relatively unimpeded radiant energy transmission path through the panel assembly allows radiant energy to be desirably transmitted to the interior environment from the higher temperature exterior environment, thereby warming the interior. When the interior temperature $T_I$ is greater than the upper predetermined interior temperature limit $T_{HI}$ and the exterior temperature $T_E$ is less than the lower predetermined exterior temperature limit $T_{LE}$, the cavity of the panel assembly is also emptied. In this temperature condition, radiant energy from the interior environment is desirably transmitted through the panel assembly to the exterior environment, thereby cooling the interior. When the exterior temperature $T_E$ is greater than the upper predetermined exterior temperature limit $T_{HE}$ and the interior temperature $T_I$ is greater than the predetermined lower interior temperature limit $T_{LI}$, or when the exterior temperature $T_E$ is less than the predetermined lower exterior temperature limit $T_{LE}$ and the interior temperature $T_I$ is greater than the predetermined upper interior temperature limit $T_{HI}$, the cavity is filled with particulate insulating material. In both of these later temperature conditions, the filled cavity creates a barrier to the transmission of thermal energy between the interior and exterior environments because it is deemed desirable to substantially isolate the interior and exterior environments so that the building air conditioning and heating system can most effectively regulate and bring the interior temperature within the predetermined desired range of interior temperatures.

In order to override the automatic operation of the logical determination means 184, the empty and fill override controls 74 and 76 are provided. The fill override control 76 comprises a normally closed switch 198 which normally supplies a high level signal on conductor 200 to one input terminal of an AND gate 202. With a high level signal on conductor 200, any signal supplied on conductor 196 to the other input terminal of the AND gate 202 is automatically conducted through the AND gate 202 and applied on conductor 204. When it is desired to override the automatic logic determination of the means 184, the switch 198 is moved to the open position thereby placing a low signal on conductor 200. The output signal from the AND gate 202 on conductor 204 under these conditions is low thereby creating a signal to fill the cavity with particulate insulating material. Signals present on conductor 204 are applied to one input of an OR gate 206 and the output signal from OR gate 206 is supplied on a conductor 208 to a latch 210.

The empty override control 74 comprises a normally open switch 212, a conductor 214 and the OR gate 206. In the normally open position of switch 212, a low level signal is present on conductor 214 which connects to the other input of the OR gate 206. In its normal position, the switch 212 allows any signal present on conductor 204 to be applied on conductor 208 and to the latch 210. When the switch 212 is closed, signifying a condition where it is desired to empty each cavity of the panel assemblies of the associated panel group, a high level signal is present on conductor 214 and is coupled through the OR gate 206 on the conductor 208 to the latch 210.

In the foregoing manner, high and low signals, respectively signifying signals to empty and fill the cavities of the associated group panel assemblies, are present on conductors 196, 204 and 208 during various conditions. Signals present on conductor 208 are the same signals automatically derived and supplied by the logic determination means 184 when the fill and empty override controls 76 and 74 respectively are not manually activated. When one of the controls 74 or 76 is activated, however, the signal on conductor 208 corresponds to the manually selected status of the cavities, regardless of the signal level on conductor 196. In this manner the inhabitants can exercise their own selective determination over the status of the cavities, and consequently, override the automatic effects of the present system.

The function of the latch 210 is to hold and retain the signal supplied at its input terminal on conductor 208 when a high level signal is supplied on conductor 216. As will become more apparent, the panel controlling circuit 64 is addressed by the delivery of a high signal on conductor 216. The signal level latched and held by the latch 210 when it is addressed by the controller 66 is operatively used to determine whether a change in status of each cavity of the associated panel group is desired.

The conductor 216 extends between the trigger terminal of the latch 210 and an output terminal of a shift register 218 which is included as part of the controller 66. The shift register 218 provides a plurality of output conductors in addition to conductor 216, for example conductors 216a, 216b, 216c and 216d. The conductors 216a, 216b, 216c and 216d lead to the trigger terminals of latches similar to latch 210 included in each of the other panel controlling circuits of the system, for example 64a (FIG. 1). A clock 222 of the controller 66 supplies clock pulses or signals on conductor 224 to the shift register 220. The clock signals on conductor 224 cause a single high signal to appear on only one of the output conductors, e.g. 216, at a time, and that high signal is shifted with each new clock pulse from one output conductor to the next in a cyclic repetitious process. In the manner of providing a single high signal on one output conductor of the shift register 220, each of the panel controlling circuits is individually addressed.

When each panel controlling circuit is addressed, an output signal from the latch 210 is compared with a signal representing the present status of the cavities. If the comparison determines that a change in status is called for, indicating that one of the interior or exterior temperatures has changed with respect to the predetermined interior and exterior temperature ranges or that one of the fill or empty override controls has been activated, control signals are supplied by the panel controlling circuit 64 to the controller 66. The controller 66 supplies activation signals which operatively control the blower, mode selection valve, and the branch valves to operatively change the condition of each of the cavities of the panel group.

With respect to the panel controlling circuit 64 shown in FIG. 8, the signal present on the input conductor 208 of the latch 210 is directly coupled to and held at an output conductor 226, but the complement or inversion of the signal on conductor 208 is simultaneously coupled to and held at another output conductor 228, upon application of a high latch signal on conductor 216. Accordingly, a low or 0 level signal on conductor 228 indicates a condition for emptying the cavity while a high or 1 level signal on the conductor 228 indicates a condition for filling the cavity. The signal on conductor 228 is used to determine whether a change in status of the cavities is automatically called for by the logical determination means 184 or manually called for by one of the override controls 74 or 76.

The signal on conductor 228 is applied to one input terminal of an exclusive OR gate 230. Other input signal to the exclusive OR gate is applied on conductor 232, and this signal is the output signal from a D-type flip flop 234. As will be described more completely, the output signal on conductor 232 from the flip flop 234 represents the prior existing status of the cavities of each panel assembly of the associated panel group prior to receipt of the latch signal on conductor 216. If there is a difference in signal level between the input signals on conductors 228 and 232 to the exclusive OR gate 230, a high output signal is supplied by the exclusive OR gate on conductor 236. If there is no difference in signal levels between the input signals on conductors 228 and 232 to the exclusive OR gate, a low level signal on conductor 236 results. An AND gate 238 receives the signals on conductor 236 and on conductor 216.

The AND gate 238 is the controlling gate for each of the panel assemblies of the associated panel group. When the output signal from the AND gate 238 on conductor 240 is low, the pre-existing status or condition of the cavities is maintained. When the output signal from the AND gate 238 on conductor 240 goes high, each of the cavities of the group of panel assemblies associated with the panel controlling circuit 64 undergoes a change of status, i.e. from filled to empty or from empty to filled.

Assume, for example, that the output of the exclusive OR gate 230 on conductor 236 goes high, indicating a requirement for a change of status of the cavities. A high level signal is supplied on conductor 240 by the AND gate 238 and is coupled to one input terminal of a master blower OR gate 242 of the controller 66. The OR gate 242 operatively delivers a high signal over the conductor 88. The signal on conductor 88 is applied to the relay 78 and to the clock enable terminal of the shift register 220. The high signal on the clock enable terminal of the shift register 220 causes the shift register 220 to stop shifting the high signal on its output conductors, e.g. 216. The high signal on conductor 88 occurs very shortly after the high output signal on conductor 216, and significantly before the next clock pulse is delivered on conductor 224, so the high output on conductor 216 is held until the high signal is removed from conductor 88. The high signal remains on conductor 88 to prevent further operation of the shift register until the status of all of the cavities of the associated panel group has been changed. As will become more apparent from the subsequent description, the high signal on conductor 240 is supplied by the AND gate 238 until the status of all of the cavities has been changed. The blower relay 78 is normally open and a signal on the conductor 88 causes the application of electrical power to the blower 36 and starts the blower 36 operating.

The high signal on conductor 240 from the AND gate 238 is also applied to one input terminal of an AND gate 244. The signal on conductor 228 is applied to the other input termnal of the AND gate 244. The output signal from the AND gate 244 is applied on conductor 246, and the signal level on conductor 246 essentially corresponds to the signal level on conductor 228 when a high enabling input signal is present on conductor 240. Thus a low or high level signal on conductor 228, respectively indicating that the cavity should be emptied or filled, will be coupled through the AND gate 244 and applied on conductor 246. The signal on conductor 246, which essentially determines whether the cavity is to be emptied or filled, is supplied to one input of a master mode valve actuator OR gate 248. A high level signal on conductor 246 is coupled through the OR gate 248 and supplied on its output conductor 84 to the electro-pneumatic switch 86.

If a change calling for emptying of the cavity is designated, a low level signal is present on conductor 246, because a low level signal on conductor 228 indicates the cavity should be emptied. In which case, a low level signal is also present on conductor 84 and the electro-pneumatic switch 86 is not operated. Under these conditions, the mode valve 34 is held or biased by a spring 250 (FIG. 1) into a position in which suction is created in the manifold 32 and air flows from the cavity toward the storage chamber to remove the particulate insulating material from the cavity of the panel assembly. However, if the signal level on conductor 246 is high, indicating that the cavity should be filled, the OR gate 248 applies a high signal to the electro-pneumatic switch 86 thereby activating it and causing the actuator means 58 to move and hold the mode valve 34 in the position illustrated in FIG. 2, where positive pressure air is directed through the manifold 32 into the storage chamber and toward the cavity 12 to carry particulate insulating material from the storage chamber into the cavity of the panel assembly. The high level signal supplied on conductor 246 thereby causes the mode valve to change into a condition in which the cavity of the panel assembly is filled with particulate insulating material.

It should be noted that the blower 36 has been activated and the mode valve actuator 58 has operated the mode valve 34 into the proper condition for filling or emptying each cavity of each panel assembly of the panel group. To actually fill and empty each individual cavity of each panel assembly of the associated group of panel assemblies, the high level signal on conductor 240 is supplied to an inverter 251 which operatively controls a shift register 252. The inverter 251 inverts the high level signal on conductor 240, and the low level signal from the inverter 251 is supplied to the clock enable and reset terminals of a shift register 252. Upon the application of a low level signal to the clock enable and reset terminals of the shift register 252, a high output signal from the shift register 252, which previously was held on a first conductor 254 of a number of output conductors, is immediately shifted to the second output conductor 80. The high level signal on conductor 80 is conducted to the electro-pneumatic switch 82 and the branch valve actuator 40 is actuated to an open position. The branch valve actuator 40 opens the branch valve 38 and allows air flow communication between the manifold 32 and the cavity of the panel assembly 14 as is shown in FIGS. 1 and 2. Accordingly, with the branch valve 38 open, air flow and particulates insulating material carried by the air flow is communicated in either direction between the cavity 12 and the storage chamber 20. Clock pulses applied on conductor 224 to the clock terminal of the shift register 252 operatively cause the high signals to be shifted one at a time through the output conductors, for example from conductor 80 to conductor 80a. One output conductor from the shift register 252 is provided for each branch valve actuator which is operatively associated with each panel assembly of the associated group of panel assemblies. Accordingly, each branch valve is opened during the time that a high level signal is applied on one of the output conductors 80, 80a, etc. of the shift register 252. Each branch valve is closed by a spring 253 (FIG. 1) or other biasing means which normally holds each branch valve in a closed position.

After all of the branch valves operatively associated with the panel group have been operated to the open position, and all of the cavities of all the panel assemblies of the associated group of panel assemblies have changed their status to the new desired status, a high signal appears on the last output conductor 256 of the shift register 252. An inverter 258 inverts the high level signal on conductor 256 and supplies a low level signal on conductor 260 to the clock input terminal of the flip flop 234. The signal on conductor 260 causes the signal on conductor 228 to be coupled through the flip flop 234 and the signal level on conductor 228 appears and is held and applied on the conductor 232. At this point the signal on conductor 232 represents the status of the window cavities after they have been changed to the newly desired status indicated by the signal on conductor 228. The signal on conductors 228 and 232 are therefore the same, and the output signal on conductor 236 from the exclusive OR gate 230 goes low. The output signal from the AND gate 238 on conductor 240 also goes low and the low signal on conductor 240 causes AND gate 244 to deliver a low signal on conductor 246. The signals on conductors 240 and 246 are thus low and the signal on conductor 88 from OR gate 242 is also low. The low signal on conductor 88 allows the shift register 220 to become operatively receptive of clock pulses on conductor 224 from the clock 222 and the shift register 220 shifts its high output from conductor 216 to the next conductor, for example 216a. The high level on conductor 216a is conducted to the latch of another panel controlling circuit, e.g. 64a (FIG. 1).

The foregoing sequence of events described in conjunction with the circuit 64 for changing the status of the cavities occurs with every other panel controlling circuit. Each of the other panel controlling circuits delivers signals over the conductors, e.g. 240a, 240b, 240c, 240d, etc., leading to the blower OR gate 242 in the same manner as the signals are delivered from circuit 64 over conductor 240. Similarly, each of the other panel controlling circuits delivers signals over conductors 246a, 246b, 264c, 246d, etc. to the actuator OR gate 248 in the same manner as the signals on conductor 246 are supplied. Furthermore, each of the other panel controlling circuits delivers signals to open each of its associated branch valves in a manner similar to that in which the shift register 252 controls the branch valves. The clock 222, of course, causes the shift register 220 to address each of the panel controlling circuits in repeating order. Once a panel controlling circuit is addressed which indicates a change of status is to be made, the shift register 220 is stopped from further operation and the clock 222 operatively controls the shift register 252 of each panel controlling circuit to open each branch valve. The period of the clock 222 is pre-established to allow sufficient time between subsequent clock pulses to complete the filling or emptying of each cavity.

Assume now, the condition where a panel controlling circuit has been addressed by the application of a high level signal on conductor 216, as shown in FIG. 8. Assume further that the logical determining means 184 and the override control 74 and 76 are in a condition which do not indicate that a change in status of the cavities of the panel assemblies of the associated panel group is desired. In this condition, the signal level present on conductor 228 is the same as the signal level present on conductor 232. The same signal level on conductors 228 and 232 results because the previous status of the cavities of the associated panel group, represented by the signal on conductor 232, remains the same and no change is called for. The output signal from the exclusive OR gate 230 is a low signal applied on conductor 236. A low signal is present on conductors 240 and 246 as a result of operation of the AND gates 238 and 244. Accordingly, low signals are also present on conductors 88 and 84, and neither the blower 36 nor the mode valve actuator 58 is actuated. The low signal on conductor 240 is inverted by the inverter 251 and the high output signal supplied by the inverter 251 causes the shift register 252 to reset and hold a high level signal on its first output conductor 254. So long as the low signal remains on conductor 240, the shift register 252 maintains the high output signal on the first output conductor 254. Therefore, so long as no change in status is required, none of the output conductors 80, 80a, etc. of the shift register 252 are supplied with high level signals whih would activate their associated branch valve actuators 40. Likewise, a low level signal is present on conductor 256 and a high level signal is present on conductor 260 as a result of operation of the inverter 258. The high level signal on conductor 260 causes the flip flop 234 to maintain its previous output signal level on the conductor 232. The signal level on conductor 232 continues to represent the continued status of the cavities.

Since a low level signal remains on conductor 88, the shift register 220 remains operative to shift its output between its output conductors 216, 216a, etc. in response to the clock pulse supplied by the clock 222 over the conductor 224. Accordingly, when a panel controlling circuit does not indicate that a change in status is required, the shift register 220 addresses the next panel controlling circuit by applying a high level signal on the next sequential output conductor.

From the foregoing description it is apparent that each of the panel controlling circuits is separately and individually addressed in a predetermined order. Once a change of status is detected, further addressing of other panel controlling circuits is terminated for the time period required to operatively change the status of all of the panel assemblies associated with the panel controlling circuit calling for a change in status.

From the description of the control system defined by the panel controlling circuitry 64 and the controller 66, it is apparent that a fully automated and precise arrangement for controlling the condition of numerous panel assemblies is provided. Due to the automated and relatively rapid nature by which effective control can be exercised, relatively rapid and effective changes in the status of the cavities can be quickly achieved to prevent undesirable heat load loss or heat load gain. Significant amounts of energy can be saved in heating or cooling dwelling houses and building structures by use of the present invention. Prior art arrangements have essentially failed to obtain the substantial improvements and advantages available as a result of the present control system and invention.

The new and improved features and concepts of the present invention have been described with a certain degree of particularly in conjunction with the preferred embodiment. It should be understood however, that the present disclosure has been made by way of preferred example and that changes in details may be made without departing from the scope of the invention defined by the appended claims.

What is claimed is:

1. A system for selectively interposing a quantity of particulate insulating material in a heat energy transmission path through a transmission panel, the particulate insulating material being characterized by weight and size limitations which allow each particle to be carried by an air flow, said system comprising:
    means defining a cavity adjacent the transmission panel and within the energy transmission path, said cavity adapted to receive therein a quantity of particulate insulating material to thereby substantially impede the transmission of energy in the energy transmission path through the transmission panel, said cavity defining means allowing relatively unimpeded transmission of energy in the energy transmission path through the panel when the cavity is empty of particulate insulating material;
    means defining an aperture communicating with an upper portion of the cavity;
    means defining a vent communicating between a lower portion of the cavity and the ambient atmosphere;
    means defining a storage chamber having a predetermined volume for receiving therein a predetermined quantity of particulate insulating material sufficient to substantially fill the cavity;
    a conduit connecting the storage chamber defining means with the aperture and communicating between the storage chamber and the cavity;
    a duct connected to the storage chamber defining means and communicating with the storage chamber;
    blower means having an inlet and an outlet, the blower means operatively creating a flow of air received at the inlet and exhausted at the outlet, the blower means creating a sufficient flow of air to transport the particulate insulating material therewith;
    mode selection means operatively connecting one of the inlet or the outlet of the blower means to the duct and simultaneously connecting the other one of the inlet or the outlet of the blower means to the ambient atmosphere;
    control means selectively controlling the mode selection means to direct the air flow from the outlet of the blower means into the duct whereby air flows through the storage chamber and the conduit toward the cavity to carry particulate insulating material from the storage chamber to the cavity, and alternatively, to direct air flow into the inlet of said blower means from the duct whereby air flows into the storage chamber through the conduit from the cavity to carry particulate insulating material from the cavity to the storage chamber; and
    air flow directing means communicating with the aperture of the cavity, said air flow directing means substantially diverting air flowing in the conduit toward the cavity away from the aperture and cavity and into the ambient atmosphere while directing the particulate insulating material carried by the air flow into the aperture and cavity, and alternatively, said air flow directing means substantially confining to the conduit the air and particulate insulating material carried by the air flowing out of the cavity through the aperture toward the storage chamber.

2. A system as defined in claim 1 operative in conjunction with a transmission panel positioned adjacent the exterior of a building, wherein said control means further comprises:
    temperature sensing means for sensing the temperature of the exterior environment of the building and for supplying signals related to the exterior temperature sensed;
    control signal supplying means receptive of the temperature related signals from said temperature sensing means, said control signal supplying means operatively supplying control signals in accordance with the relationship of the temperature related signals to a predetermined range of exterior temperatures; and
    wherein said control means operatively controls said mode selection means to operatively fill or empty the cavity of particulate insulating material in accordance with the control signals.

3. A system as defined in claim 2 wherein said control signal supplying means operatively supplies control signals causing said cavity to be emptied upon the exterior sensed temperature varying within the predetermined range of exterior temperatures defined by predetermined upper and lower temperature limits.

4. A system as recited in claim 2 or 3 for use with a plurality of transmission panels wherein each panel has operatively associated therewith an aforesaid cavity, aperture, vent, air flow directing means, conduit, storage chamber, and duct, said system further comprising:
    a plurality of associated temperature sensing and control signal supplying means, associated ones of each of said temperature sensing and control signal supplying means being associated with a panel group, each panel group comprising at least one transmission panel, each temperature sensing means sensing the temperature of the environment adjacent its associated panel group, each control signal supplying means supplying control signals in relation to the temperature related signals of its associated temperature sensing means;
    a manifold communicating between said mode selection means and each of the plurality of ducts;
    a plurality of controllable valves, one controllable valve operatively connected in each air duct between the manifold and the storage chamber, each controllable valve being operative between an open position in which air flow communication between the manifold and the storage chamber is effected and a closed position in which air flow communication between the manifold and the storage chamber is substantially prevented;

actuator means operatively connected with said control means and each controllable valve for individually operating each controllable valve to its open and closed conditions; and wherein said control means operatively receives control signals from each control signal supplying means associated with each panel group, and said control means operatively controls said mode selection means and said actuator means to operatively conduct particulate insulating material into and out of each cavity associated with each transmission panel of any one panel group.

5. A system as defined in claim 4 wherein said control means operatively controls said mode selection means and said actuator means to operatively fill or empty each cavity of an associated panel group one at a time.

6. A system as defined in claim 2 wherein:

said temperature sensing means also senses the temperature of the interior environment in the building and supplies signals related to both the exterior and interior temperatures sensed;

said control signal supplying means supplies control signals in accordance with the relationship of the temperature related signals to a predetermined relationship of predetermined interior and exterior temperature ranges; and said system is operatively connected with a plurality of transmission panels wherein each panel has operatively associated therewith an aforesaid cavity, aperture, vent, air flow directing means, conduit, storage chamber, and duct, said system further comprising:

a plurality of associated temperature sensing and control signal supplying means, associated ones of each of said temperature sensing and control signal supplying means being associated with a panel group, each panel group comprising at least one transmission panel, each temperature sensing means sensing the temperature of the exterior environment adjacent its associated panel group and sensing the temperature of the interior environment adjacent its associated panel group, each control signal supplying means supplying control signals in relation to the temperature related signals of its associated temperature sensing means;

a manifold communicating between said mode selection means and each of the plurality of ducts;

a plurality of controllable valves, one controllable valve operatively connected in each air duct between the manifold and the storage chamber, each controllable valve being operative between an open position in which air flow communication between the manifold and the storage chamber is effected and a closed position in which air flow communication between the manifold and the storage chamber is substantially prevented;

actuator means operatively connected with said control means and each controllable valve for individually operating each controllable valve to its open and closed conditions; and wherein said control means operatively receives control signals from each control signal supplying means associated with each panel group, and said control means operatively controls said mode selection means and said actuator means to operatively conduct particulate insulating material into and out of each cavity associated with each transmission panel of any one panel group.

7. A system as defined in claim 6 wherein said control signal supplying means supplies control signals operatively causing each cavity to be emptied of particulate insulating material upon the exterior senses temperature varying within the predetermined range of exterior temperatures defined by predetermined upper and lower exterior temperature limits.

8. A system as defined in claim 7 wherein control signals operatively causing each cavity to be emptied of particulate insulating material are supplied by said control signal supplying means upon either one of the following conditions:

the exterior sensed temperature decreasing below the predetermined lower temperature limit of the predetermined range of exterior temperatures and the interior temperature exceeding a predetermined upper temperature limit of the predetermined range of interior temperatures; or the exterior temperature exceeding the predetermined upper temperature limit of the predetermined range of exterior temperatures and the interior temperature decreasing below a predetermined lower temperature limit of the predetermined range of interior temperatures.

9. A system as defined in claim 8 wherein control signals operatively causing the cavity to be filled with particulate insulating material are supplied by said control signal supplying means upon any one of the following conditions:

the exterior temperature exceeding the predetermined upper temperature limit of the predetermined range of exterior temperatures and the interior temperature exceeding the predetermined lower temperature limit of the predetermined range of interior temperatures; or the exterior temperature decreasing below the predetermined lower temperature limit of the predetermined range of exterior temperatures and the interior temperature decreasing below the predetermined upper temperature limit of the predetermined range of interior temperatures.

10. An improved panel assembly having a frame and a pair of spaced energy transmission panels connected to the frame to define an interior cavity between the frame and the panels adapted to be filled with or emptied of particulate insulating material carried by a flow of gas into or out of the cavity, the improvements to said panel assembly comprising in combination:

means defining an aperture communicating with the upper portion of the cavity through which the flow of gas and the carried particulate insulating material moves into and out of the cavity, the aperture having a predetermined cross sectional area through which the gas and particulate insulating material flows;

means defining a vent continuously communicating between a lower portion of the cavity and the ambient environment and through which gas may flow into and out of the cavity, said vent having a predetermined cross sectional area through which the gas flows which is greater than the predetermined cross sectional area of the aperture;

filter means positioned relative to the vent for preventing particulate insulating material from flowing through the vent and for allowing gas to flow through the vent; and flow directing means communicating with the upper portion of the cavity and defining a first gas flow path communicating to the cavity through the aperture and a second gas flow path communicating to the ambient atmosphere exterior of the cavity, said flow directing means operatively directing gas flowing toward the cavity into substantially both the first and second flow paths and operatively confining gas flowing out of the cavity through the aperture into only the first flow path.

11. An improved panel assembly as defined in claim 10 wherein said flow directing means further comprises:
filter means positioned in the second flow path for operatively preventing particulate insulating material from flowing through the second flow path.

12. An improved panel assembly as defined in claim 11 wherein said flow directing means further comprises:
blocking means operatively substantially closing the second flow path to the movement of gas therethrough upon the condition of gas flowing out of the cavity through the aperture.

13. An improved panel assembly as defined in claim 10 wherein said flow directing means further comprises:
blocking means operatively normally closing the second flow path to the movement of gas therethrough and opening the second flow path to the movement of gas therethrough upon the gas pressure at the aperture exceeding the pressure of the ambient environment by a predetermined amount.

14. An improved panel assembly as defined in claim 10 or 13 wherein said flow directing means further comprises:
a segment of conduit operatively connected to the aperture and communicating with the cavity, the first flow path being defined by a communication passage through the conduit and the aperture and into the cavity;
said conduit segment defining an opening therethrough into the ambient environment exterior of the cavity, the second flow path being defined by a communication passage from the conduit segment through the opening into the ambient environment;
a screen extending through the opening and having a characteristic sufficient to prevent particulate insulating material from moving through the opening but allowing gas to pass therethrough;
a valve member movably connected to the conduit segment and moveable to a closed position to substantially seal the opening and moveable to an open position to substantially open the opening to gas flow therethrough; and
biasing means operatively connected between the conduit segment and the valve member to normally bias the valve member to the closed position, said biasing means having a characteristic allowing the valve member to move to the open position upon the gas pressure in the conduit segment exceeding the pressure of the ambient environment by a predetermined amount.

15. An improved panel assembly as defined in claim 10 further comprising means for pivotably connecting one of said transmission panels to said frame whereby the pivotably connected panel can be pivoted to provide access to said cavity.

16. In a system operative for selectively filling a cavity in an energy transmission panel assembly with a quantity of particulate insulating material carried by a flow of gas supplied by blower means and for emptying the cavity of particulate insulating material by a flow of gas supplied by the blower means, an improved storage chamber for the particulate insulating material comprising:
means defining an enclosure for said storage chamber;
a first port formed in the enclosure and through which operative communication between a lower portion of the storage chamber and the cavity of the panel assembly is operatively effected;
a second port formed in the enclosure and through which communication between the lower portion of the storage chamber and the blower means is operatively effected, said second port having a predetermined cross sectional area through which gas flows;
a third port formed in the enclosure and through which communication between an upper portion of the storage chamber and the blower means is operatively effected; and
filter means connected to both the second and third ports for preventing particulate insulating material from flowing through the second and third ports and for allowing gas to flow through the second and third ports, said filter means connected to the third port having a predetermined cross sectional area through which gas flows and which is substantially greater than a predetermined cross sectional area of said filter means connected to the second port.

17. An improved storage chamber as defined in claim 16 wherein said first and second ports communicate with the lowermost portion of the storage chamber.

18. An improved storage chamber as defined in claim 17 wherein the storage chamber is generally cylindrically shaped, and the axis of the cylindrical shape extends generally horizontally, and the first and second ports are generally axially aligned with one another parallel to the axis of the cylindrical shape.

19. An improved storage chamber as defined in claim 17 further comprising:
means for connecting the second and third ports in parallel communicating relationship with one another and to said blower means.

20. A method of positioning a storage chamber for particulate insulating material in a building having an interior ceiling spaced below an upper building structure, wherein the storage chamber is included in a system operative for selectively filling and emptying a cavity of an energy insulating panel assembly with the particulate insulating material carried between the cavity and the storage chamber by a flow of gas supplied by blower means of said system, said method comprising the steps of:
locating the storage chamber in the space between the interior ceiling and the upper building structure; and
operatively communicatively connecting the storage chamber with at least one cavity of an energy transmission panel assembly.

21. A method as defined in claim 20 further comprising the step of:
communicatively connecting one storage chamber with one panel assembly for direct communication of particulate insulating material and the flow of gas between the one storage chamber and the one cavity.

22. A method as defined in claims 20 or 21 further comprising steps of:
- providing a plurality of storage chambers and panel assemblies, ones of each storage chamber and each panel assembly being located and connected in the aforesaid manner;
- connecting each storage chamber in parallel gas flow communicating relation with the blower means; and
- individually controlling the flow of gas between each storage chamber and the blower means.

23. A method as defined in claim 22 wherein said blower means comprises a single blower connected in flow communicating relation with said plurality of storage chambers.

24. In a system operative for selectively filling a cavity in an energy transmission panel assembly with particulate insulating material carried in a conduit from a storage chamber to the cavity by a flow of gas operatively supplied by blower means having an inlet for receiving gas and an outlet for exhausting gas, said system also operative for emptying the cavity of particulate insulating material by a flow of gas from the cavity to the storage chamber, the system including flow conducting means for conducting the flow of gas between the blower means and the storage chamber; an improvement in combination therewith comprising:
- mode selection means communicatively connected to the flow conducting means and to the inlet and to the outlet of the blower means and to the abient atmosphere, said mode selection means operatively and selectively connecting one of either the inlet or the outlet of said blower means to the flow conducting means and simultaneously operatively connecting the other one of the inlet or the outlet to the ambient atmosphere, whereby gas flows from the cavity toward the storage chamber through the flow conducting means and into the inlet of the blower means, or alternatively, gas flows out of the outlet of the blower means and through the flow conducting means and from the storage chamber towards the cavity.

25. An invention as defined in claim 24 wherein said mode selection means comprises:
- a junction structure having four ports, a first of the ports externally communicating with the flow conducting means, a second of the ports externally communicating with the ambient atmosphere, a third of the ports externally communicating with the inlet to said blower means, and a fourth of the ports externally communicating with the outlet of said blower means;
- valve means operatively connected to said junction structure and movable to a first position to connect the first and third ports in communicating relation and to connect the second and fourth ports in communicating relation and to substantially seal the first and second ports against communication with the third and fourth ports, and movable to a second position to connect the first and fourth ports in communicating relation and to connect the second and third ports in communicating relation and to substantially seal the first and fourth ports from communication with the second and third ports; and
- mode actuation means for moving said valve means to the first and second positions.

26. An invention as defined in claim 25 wherein said junction structure comprises a four port union in which the four ports internally communicate with one another and said valve means comprises a butterfly valve pivotably retained within the union to operatively create the recited flow communication conditions.

27. An invention as defined in claim 26 wherein said system is operative with a plurality of energy transmitting panel assemblies and storage chambers, each panel assembly including a cavity, each storage chamber connected by the conduit to at least one cavity; and further comprising:
- a manifold operatively communicatively connected to the first port of said junction structure;
- a plurality of branch ducts connected in parallel communicating relation with said manifold, one branch duct connected to each storage chamber;
- the aforesaid flow conducting means comprising the manifold and the plurality of branch ducts;
- a plurality of branch valve means, each branch valve means operatively connected in a branch duct and movable to open and closed positions to respectively allow and prevent air flow to the storage chamber communicatively connected with the branch duct in which said each branch valve means is operative; and
- branch valve actuation means for selectively moving each branch valve means to its open and to its closed positions.

28. An invention as defined in claim 27 further comprising:
- control means operatively connected to control both said mode actuator means and said branch valve actuator means to individually and selectively direct the air flow of said blower means into and out of each storage chamber, whereby to carry the particulate insulating material into and out of the cavity, respectively.

29. An invention as defined in claim 28 further comprising:
- temperature sensing means thermally associated with at least one panel assembly for sensing temperature in the environment adjacent said one panel assembly and for supplying signals related to the temperature sensed;
- control signal supplying means receptive of the temperature related signals and operatively supplying control signals in accordance with the relationship of the temperatures sensed to a predetermined range of temperatures; and
- wherein said control means operatively controls both said mode actuator means and said branch valve actuator means in response to said control signals.

30. An invention as defined in claim 29 wherein:
- said temperature sensing means senses temperatures in the environments at the exterior and interior of said one panel assembly and supplies control signals representative of both temperatures sensed;
- said control signal supplying means supplies control signals in accordance with the relationship of the temperature related signals to a predetermined relationship of predetermined interior and exterior temperature ranges; and
- said control signal supplying means supplies control signals for operatively emptying the cavity of particulate insulating material if the exterior sensed temperature is within a predetermined range of exterior temperatures.

31. An invention as defined in claim 30 wherein:
one temperature sensing and one control signal supplying means are operatively associated with an associated group of panel assemblies, each associated group of panel assemblies including a plurality of panels less than the total number of panel assemblies of said system; and
each said control signal supplying means supplies control signals for operatively and individually filling all of the cavities of the panel assemblies of its associated group or for operatively and individually emptying all of the cavities of the panel assemblies of its associated group, said control signal supplying means supplying the control signals in accordance with the relationship of the temperatures sensed to a predetermined relationship of predetermined interior and exterior temperature ranges.

32. A method of controlling a system for selectively filling a cavity of an energy transmission panel assembly with particulate insulating material and for selectively emptying the cavity, the system including blower means for delivering a flow of gas, a storage chamber for containing the particulate insulating material when the cavity is empty of insulating material, gas flow conducting means communicating the flow of gas through the storage chamber and with the cavity, the particulate insulating material having a size and weight characteristic which allows it to be transported by the flow of gas, and mode selection means associated with the blower means for selectively reversing the direction of gas flow between the cavity and the storage chamber whereby gas flows from the storage chamber to the cavity in a first condition to fill the cavity and gas flows from the cavity to the storage chamber in a second condition to empty the cavity, said control method comprising steps of:
sensing the temperature in an environment on a first side of the panel assembly;
establishing predetermined high and low temperature limits defining a first predetermined range of temperatures with respect to the environment on the first side of the panel assembly;
comparing the temperature sensed in the environment on the first side of the panel assembly with the predetermined high and low temperature limits of the first predetermined range of temperatures;
logically determining if the temperature sensed in the environment on the first side of the panel assembly indicates that the cavity should be filled with or emptied of particulate material in accordance with a predetermined relationship defined by the first predetermined range of temperatures; and
controlling said mode selection means in accordance with the aforesaid logical determination.

33. A method as defined in claim 32 further comprising the step of:
controlling said mode selection means to operatively direct the gas flow from said blower means to empty each cavity of particulate insulating material if the temperature sensed in the environment at the first side of the panel assembly is within the first predetermined range of temperatures.

34. A method as defined in claim 32 further comprising steps of:
sensing the temperature in an environment on an opposite second side of the panel assembly;
establishing predetermined high and low tempertture limits defining a second predetermined range of temperatures with respect to the environment on the second side of the panel assembly;
comparing the temperatures sensed in the environment on the second side of the panel assembly with the predetermined high and low temperature limits of the second predetermined range of temperatures; and
wherein said step of logically determining proceeds in accordance with a predetermined relationship defined by the first and second predetermined ranges of temperatures.

35. A method as defined in claim 34 further comprising steps of:
determining whether the cavity of the panel assembly is filled with particulate insulating material or whether the cavity of the panel assembly is empty of particulate insulating material,
controlling said mode selection means to operatively direct the gas flow from the storage chamber to the cavity to fill the cavity with particulate insulating material upon determining that the cavity is empty and that the temperature sensed in the environments on the first and second sides of the panel assembly indicate that the cavity should be filled in accordance with the predetermined relationship, and
controlling said mode selection means to operatively direct the gas flow from the cavity to the storage chamber upon a determination that the cavity is filled and that the temperatures sensed in the environments on the first and second sides of the panel assembly indicate that the cavity should be emptied in accordance with the predetermined relationship.

36. A method as defined in claim 35 wherein said system further includes a plurality of panel assemblies defined into a plurality of panel groups, each panel group including a plurality of panel assemblies, one storage chamber communicatively connected with each individual panel assembly, valve means communicatively connected in the gas flow path of the flow conducting means between the blower means and each individual storage chamber, said valve means being movable to an open position to allow gas flow between the blower means and the individual storage chamber with which the valve means is associated and movable to a closed position to prevent gas flow between the blower means and the individual associated storage chamber, said method further comprising the steps of:
sensing the temperatures in the environments on opposite sides of the panel assemblies in each panel group; and
opening one at a time in predetermined sequence each valve means associated with each storage chamber individually connected to each panel assembly of the associated panel group to allow gas flow to transport the particulate insulating material between the storage chamber and the cavity in accordance with the temperatures sensed and the predetermined relationship.

37. A method as defined in claim 36 further comprising:
addressing each of the plurality of panel groups in a predetermined order until all panel groups have been addressed for the purpose of accomplishing the aforesaid steps, and accomplishing the aforesaid steps during the time each panel group is addressed.

38. A method as defined in claim 36 further comprising the step of:
controlling said mode selection means to operatively direct the gas flow from said blower means to empty each cavity of particulate insulating material if the temperature sensed in the environment at the first side of the panel assembly is within the first predetermined range of temperatures.

39. A method as defined in claim 38 further comprising the step of controlling said mode selection means to operatively direct the gas flow from said blower means to empty the cavities if, upon the occurrence of any one of:
the temperature sensed in the environment at the first side of said panel is less than the lower temperature limit of the first predetermined range of temperatures and the temperature sensed in the environment at the second side of the panel assembly is greater than the higher temperature limit of the second predetermined range of temperatures, or
the temperature sensed in the environment at the first side of the panel assembly is greater than the higher temperature limit of the first predetermined range of temperatures and the temperature sensed in the environment at the second side of the panel assembly is less than the lower temperature limit of the predetermined second range of temperatures.

40. A method as defined in claim 39 further comprising the step of controlling said mode selection means to operatively direct the gas flow from the blower means to fill the cavity with particulate insulating material upon the occurrence of any one of:
the temperature sensed in the environment at the first side of the panel assembly is greater than the higher temperature limit of the first predetermined temperature range and the temperature sensed in the environment at the second side of the panel assembly is greater than the lower temperature limit of the second predetermined range, or
the temperature sensed in the environment at the first side of the panel assembly is less than the lower temperature limit of the first predetermined temperature range and the temperature sensed in the environment at the second side of the panel assembly is less than the upper temperature limit of the second predetermined temperature range.

* * * * *